US007637002B2

(12) United States Patent
Shover et al.

(10) Patent No.: US 7,637,002 B2
(45) Date of Patent: Dec. 29, 2009

(54) ASSEMBLY FOR REMOVING A DEVICE FROM A BOILER

(75) Inventors: Stephen L. Shover, Millersport, OH (US); Clinton A. Brown, Baltimore, OH (US)

(73) Assignee: Diamond Power International, Inc., Lancaster, OH (US)

( * ) Notice: Subject to any disclaimer, the term of this patent is extended or adjusted under 35 U.S.C. 154(b) by 798 days.

(21) Appl. No.: 11/153,671

(22) Filed: Jun. 15, 2005

(65) Prior Publication Data

US 2006/0032468 A1 Feb. 16, 2006

Related U.S. Application Data

(60) Provisional application No. 60/580,076, filed on Jun. 15, 2004.

(51) Int. Cl.
*B23P 21/00* (2006.01)
*B08B 3/00* (2006.01)

(52) U.S. Cl. ........................................ 29/717; 122/379

(58) Field of Classification Search ................ 29/426.1, 29/717, 700; 277/432, 580; 122/379; 134/22.1, 134/34
See application file for complete search history.

(56) References Cited

U.S. PATENT DOCUMENTS 3,385,605 A * 5/1968 Hylbert et al. .............. 277/432
4,093,242 A * 6/1978 Terry .......................... 277/580

* cited by examiner

*Primary Examiner*—John C Hong
(74) *Attorney, Agent, or Firm*—Brinks Hofer Gilson & Lione

(57) ABSTRACT

An assembly and a method for removing a removable device from a wall box are provided. The removable device forms a substantially fluid-tight wall box seal with a wall box opening when the removable device is in a first position. The assembly for removing the removable device includes a sealing assembly located adjacent to the wall box opening and forming a substantially fluid-tight seal with a sealing portion of the removable device when the removable device is in a second position with respect to the wall box.

19 Claims, 9 Drawing Sheets

ASSEMBLY FOR REMOVING A DEVICE FROM A BOILER

CROSS-REFERENCE TO RELATED PATENT APPLICATIONS

This patent application claims the benefit of U.S. provisional patent application 60/580,076, filed Jun. 15, 2004.

BACKGROUND

The invention relates to a method and an assembly for removing a device from a wall box for a large-scale combustion device. The wall box is located within a wall port of the combustion device in order to receive the device, such as a cleaning device or an imaging device.

During the operation of large-scale combustion devices, such as boilers that burn fossil fuels, slag and ash encrustations develop on interior surfaces of the boiler. The presence of these deposits degrades the thermal efficiency of the boiler. Therefore, it is periodically necessary to remove such encrustations. Various removable cleaning devices are currently used to remove these encrustations.

One such type of removable cleaning device includes a device referred to as a "sootblower". Sootblowers are used to project a stream of cleaning fluid, such as air, steam or water, into the interior volume of the boiler. In the case of long retracting type sootblowers, a lance tube is periodically advanced into and withdrawn from the boiler. As the lance tube is advanced into and withdrawn from the boiler, it rotates or oscillates in order to direct one or more jets of cleaning fluid at desired surfaces within the boiler. In the case of stationary sootblowers, the lance tube is maintained within the boiler during periods of use and during periods of non-use. Sootblower lance tubes project through openings in the boiler wall, referred to as wall ports. The wall ports may include a mounting assembly, such as a wall box, in order to properly position the lance tube with respect to the boiler wall.

Retracting sootblowers are typically partially or completely removed from the wall box when not in use. Therefore, retracting sootblowers are frequently inserted to and removed from the boiler interior volume. Although stationary sootblowers are typically maintained within the boiler interior volume, they may need to be removed from the boiler for servicing the sootblower or for other various purposes. Therefore, retracting sootblowers and stationary sootblowers are both considered to be removable cleaning devices.

Another such type of removable cleaning device is commonly referred to as a "water cannon". Water cannons involve the use of a monitor or nozzle positioned within a wall port in order to eject a stream of fluid, such as water, into the interior volume of the combustion device. The water cannon nozzle typically includes a pivot joint to permit adjustment of the direction of the stream of fluid. Similarly to the sootblower, the water cannon nozzle is positioned within the wall port via a mounting assembly, such as a wall box. Unlike the sootblower, however, the water cannon nozzle preferably includes a pivotable ball joint coupled with the wall box in order to adjust the direction of the stream of fluid flowing into the boiler interior volume. Due to the presence of the pivotable ball joint, the wall port for a water cannon assembly is typically larger than the wall port for a sootblower.

Similarly to the stationary sootblower, the water cannon nozzle is typically maintained within the boiler during periods of use and during periods of non-use. However, water cannon assemblies may need to be removed from the boiler for servicing the water cannon or for other various purposes. Therefore, water cannon assemblies are also considered to be removable cleaning devices.

Other removable devices, besides cleaning devices, may penetrate the boiler wall via a wall port in order to perform a desired function. One such device is an imaging device, such as an infrared imaging device. Imaging devices are often used to examine the interior volume and the interior surfaces of the boiler in order to check the boiler status or to perform maintenance on the boiler. Similarly to the cleaning devices, the imaging device typically penetrates a wall port in order to view the boiler interior volume. The imaging device may be extended into the boiler interior volume similarly to a sootblower lance, it may be coupled with a pivoting ball joint similarly to a water cannon assembly, or it may be used in any other appropriate configuration. Regardless of the configuration of the imaging device, it typically includes a mounting assembly located within the boiler wall port.

Depending on the configuration of the imaging device, it may be typically maintained within the boiler during periods of use and during periods of non-use, or it may typically be removed from the boiler during periods of non-use. Regardless of the typical configuration of the imaging device with respect to the boiler, the imaging device may need to be removed from the boiler for servicing the device or for other various purposes. Therefore, imaging devices are considered to be removable cleaning devices regardless of their typical configuration with respect to the boiler.

Boiler gases may pose various health risks and dangers, such as including toxic or otherwise dangerous compositions. Therefore, it is advantageous to include substantially fluid-tight seal(s) between various components of the wall box and of the removable device.

Furthermore, boiler gases typically reach extremely high temperatures. Therefore, it is advantageous to include heat-resistant seal(s) between various components of the wall box and of the removable device in order to protect the boiler users from the boiler temperatures and in order to minimize fire hazards. The fluid-tight seals and the heat-resistant seals may be the same seals performing multiple functions.

Positive-pressure boilers operate with an internal pressure higher than the ambient pressure some boilers. Therefore, due to the internal pressure of positive-pressure boilers, it may be especially difficult to maintain the substantially seals and prevent boiler gases from escaping during removal of the removable device from a positive-pressure boiler.

Other types of boilers, such as ambient-pressure boilers and negative-pressure boilers, also may experience undesirable gas exchange with the ambient air if preventative measures are not taken. Similarly, the heat of the boiler gas may pose health and fire hazards regardless of the pressure differential between the boiler interior and the ambient air. Therefore, it is desirable to maintain the seals during removal of the removable device in all types of boilers.

As seen from above, it is desirous to provide an improved system and an improved method for protecting boiler users, minimizing fire hazards, and substantially preventing fluid exchange between the boiler and the ambient air during removal of various removable devices from the boiler wall box.

SUMMARY

In overcoming the disadvantages and drawbacks of the known technology, the current invention provides an assembly and a method for removing a removable device from a wall box. The wall box includes a wall box opening for receiving the removable device and for forming a substantially fluid-tight wall box seal when the removable device is in a first position with respect to the wall box.

The assembly for removing the removable device from the wall box includes a sealing assembly located adjacent to the wall box opening. The removable device includes a sealing portion for forming a substantially fluid-tight seal with the sealing assembly when the removable device is in a second position with respect to the wall box.

In one configuration, the sealing assembly includes a sealing collar assembly coupled to the wall box. The sealing collar assembly selectively forms the seal when the removable device is in the second position. The sealing portion of the removable device may include an adaptor having an outer surface for forming the seal with the sealing collar assembly. Additionally, the sealing panel assembly may include an inner surface having a substantially cylindrical shape and the adaptor outer surface may have a substantially circular cross-section.

In another configuration, the sealing assembly further includes a sealing panel assembly for selectively forming a substantially fluid-tight sealing panel seal when the removable device is in the second position. The sealing panel assembly may include a sealing panel base portion that forms a substantially fluid-tight base portion seal with the wall box. Furthermore, the sealing panel may include a movable panel for forming the sealing panel seal when the removable device is in the second position.

In yet another configuration, the assembly for removing the removable device from the wall box includes an extracting assembly for moving the removable device from the first position to the second position. The extracting assembly may include a threaded screw, a rotatable threaded collar for receiving the threaded screw, and an anti-rotation device for substantially preventing rotation of the threaded screw.

In another configuration, removable device is received within a sleeve that includes an aspirating opening extending through the sleeve. Furthermore the assembly for removing the removable device from the wall box includes an aspirating device coupled with the sleeve order to form a substantially fluid-tight aspirating seal between the aspirating device and the seal. The aspirating device further supplies an aspirating fluid flow through the aspirating opening of the sleeve.

In another configuration, the current invention provides an assembly for removing a water cannon assembly from a wall box opening. The wall box is coupled with a combustion device having an interior volume defined by a wall. The water cannon assembly includes a steering tube having a steering tube conduit, a supply tube located within the steering tube and supplying a cleaning fluid to the combustion device interior volume, and a pivot joint connected to the steering tube. The pivot joint forms a substantially fluid-tight wall box seal with the wall box opening when the water cannon assembly is in a first position with respect to the wall box.

The assembly for removing the water cannon assembly from the wall box opening includes an aspirating device coupled with the steering tube and a sealing assembly located adjacent to the wall box opening. The aspirating device forms a substantially fluid-tight aspirating seal with the steering tube and supplies an aspirating fluid flow through an aspirating opening of the steering tube and into the steering tube conduit.

In another configuration, the current invention provides a method for removing a water cannon assembly from a wall box opening. The method includes the steps of coupling an aspirating device to the steering tube in order to form a substantially fluid-tight aspirating seal; supplying an aspirating fluid flow through the aspirating opening and into the conduit via the aspirating device; removing the supply tube from the steering tube; removing the aspirating device from the steering tube; connecting a sealing panel assembly to the wall box such that a sealing panel of the sealing panel assembly is adjacent to the wall box; moving the water cannon assembly to a second position such that the sealing portion of the water cannon assembly forms a substantially fluid-tight sealing panel assembly seal with the sealing panel assembly; and moving the sealing panel to a closed position such that the sealing panel and the wall box form a substantially fluid-tight second sealing panel assembly seal.

In yet another configuration, the current invention provides a sealing box at least partially defining a sealing chamber encompassing at least a portion of the water cannon assembly and fluidly sealing the sealing chamber from the ambient air. Furthermore, an access assembly provides access to the portion of the water cannon assembly while the sealing chamber is substantially fluidly sealed from the ambient air.

In one configuration, the method further includes the step of inserting a steering tube plug into the steering tube such that a sealing surface of the steering tube plug cooperates with a sealing surface of the steering tube to form a substantially fluid-tight steering tube plug seal. The method also includes the step of extracting the water cannon assembly from a collar portion of the sealing panel assembly. Furthermore, the method includes the step of inserting a combustion device plug into sealing panel assembly in order to form a substantially fluid-tight third sealing panel seal. Additionally, the sealing panel is moved from the closed position to an open position. A combustion device plug is also inserted into the wall box opening to form a substantially fluid-tight second wall box seal.

The above configurations of the present invention may permit a removable device to be removed from a combustible device while the combustible device has a relatively high interior temperature or while the combustible device is still in operation, thus potentially reducing maintenance time and potentially reducing hazardous conditions caused by the combustible device.

DETAILED DESCRIPTION

Figure 1:
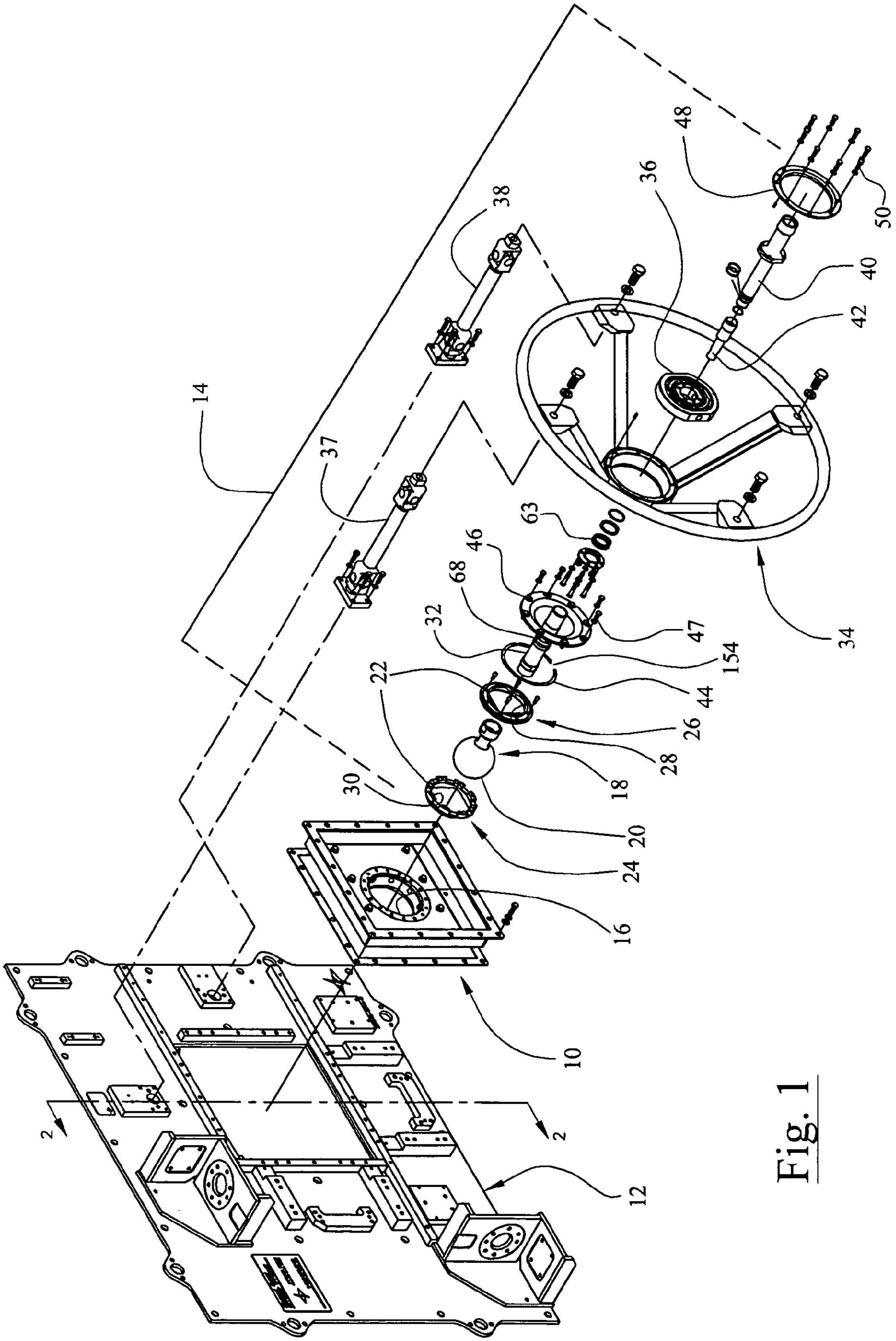
FIG. 1 is an exploded view of a water cannon assembly and a wall box embodying the principles of the present invention, wherein the water cannon assembly and the wall box are to be selectively coupled to each other such that a steering tube and a pivot joint of the water cannon assembly provide a pivotable connection with the wall box.

Referring now to the present invention, FIG. 1 is an exploded view of a removable device to be selectively coupled with a wall box 10 that is mounted to a combustion device via a mounting plate 12. The removable device shown is a water cannon assembly 14, but it may be any appropriate device, such as a sootblower or an imaging device. The water cannon assembly 14 receives a cleaning fluid and ejects the cleaning fluid into the interior volume of the boiler, as will be discussed below in more detail.

In order to effectively clean various sections of the boiler interior volume, the water cannon assembly 14 is pivotably mounted within a wall box opening 16. More specifically, a pivot joint 18 of the water cannon assembly includes a sealing portion 20 that forms a substantially fluid-tight seal with a pivot joint socket 22 that is received within the wall box opening. The pivot joint socket 22 preferably includes an interior portion 24 located within the boiler interior volume and an exterior portion 26 located external to the boiler. The exterior portion 26 performs two functions: forming a water-tight seal with the pivot joint 20 and permitting the pivot joint 20 to pivot at a wide range of angles within the pivot joint socket 22. Therefore, it is advantageous for the exterior portion 26 of the pivot joint socket 22 to have a generally circular inner surface 28, and for the sealing portion 20 of the pivot joint 18 to be generally spherical.

Similarly to the exterior portion 26, the interior portion 24 of the pivot joint socket 22 forms a substantially water-tight seal with the pivot joint 18 and permits pivoting movement of such. Therefore, the interior portion 24 of the pivot joint socket 22 also preferably includes a generally circular inner surface 30. The interior portion 24 also may include a plurality of seal air openings, which will be discussed with more detail below.

The pivot joint 18 is connected to a steering tube 32 via a snap fit connection, or other appropriate connection such as a tab-and-slot connection. The steering tube 32 is also connected to a steering assembly 34 via a cardon joint 36. The steering assembly 34 is preferably a wheel-shaped mechanism, not unlike an automotive steering wheel, that controls the pivoting movement of the steering tube 32 and the pivot joint 18. The steering assembly 34 preferably includes at least two support arms 37, 38 that each allow pivotable movement about a different axis, thus allowing the steering assembly 34 to travel along an imaginary path that is substantially hemispherical.

The steering assembly 34 may also be coupled with a pair of actuating arms (not shown) that apply actuating forces to the steering assembly. As is known in the art, the actuating arms may be in electrical connection with a controller in order to automatically adjust the position of the steering assembly 34 and thus automatically adjust the pivot angle of the water cannon assembly 14.

The cardon joint 36 is preferably located adjacent to the centerpoint of the steering assembly 34 and permits a pivotable connection between the steering tube 32 and the steering assembly 34 such that the steering tube 32 is always substantially perpendicular to a plane defined by the circular portion of the steering assembly 34. Alternatively, any appropriate connection may be instead of a cardon joint 36.

A supply tube 40 is preferably received within the steering tube 32 in order to supply the cleaning fluid for the interior volume of the combustible device. The supply tube 40 preferably includes a nozzle 42 to be inserted within the pivot joint 18 and to properly control the spray of the cleaning fluid. The nozzle 42 and the supply tube 40 may be a single, integral part or they may be connected by a substantially fluid-tight seal, such as a snap-fit connection, or other appropriate means. Additionally, sealing washers may be provided in order to more effectively form the fluid-tight seal between the nozzle 42 and the supply tube 40.

The water cannon assembly 14 shown in FIG. 1 includes various assembly components for assembling the previously-described components together. One such assembly component is a retainer ring 44 that fits over the outer face of the exterior portion 26 in order to secure the pivot joint socket 22 and the pivot joint 18 within the wall box 10. The retainer ring 14 preferably is a C-shaped ring that forms a snap-fit connection with the wall box 10, as will be discussed in further detail below with respect to FIG. 2.

Another such assembly component is a pivot joint clamping ring 46 that is preferably fastened to the wall box 10 in order to secure the retainer ring 44 and the pivot joint 18 in place. The pivot joint clamping ring 46 is preferably a closed ring that is fastened to the wall box 10 by appropriate fasteners, such as by fasteners 47 shown in FIG. 1. A cardon joint clamping ring 48 is also preferably fastened to the steering assembly 34 in order to hold the cardon joint 36 in place. The cardon joint clamping ring 48 is preferably fastened to the steering assembly 34 by appropriate fasteners 50.

Figure 2:
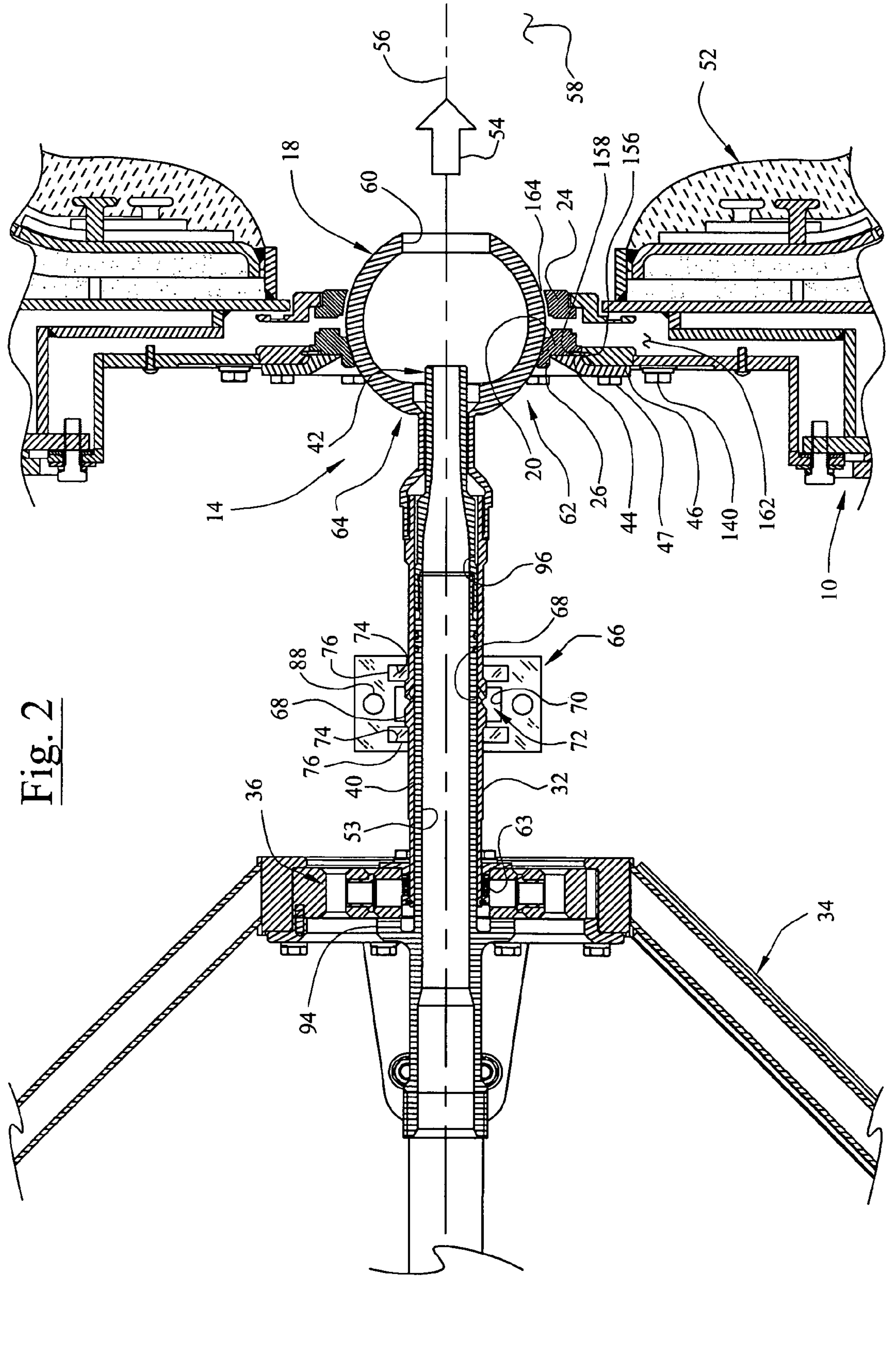
FIG. 2 is a cross-sectional view of the water cannon assembly taken along line 2-2 in FIG. 1, further showing a combustion device coupled with the wall box and further showing an aspirating device mounted to the exterior surface of the water cannon assembly steering tube.

FIG. 2 shows the water cannon assembly 14 mounted in a boiler wall 52 such that stream of cleaning fluid (generally indicated by arrow 54) flows from the nozzle 42 along a water cannon assembly axis 56 and into the boiler interior volume 58. More specifically, the supply tube 40 includes an interior surface 53 defining a conduit that carries the stream of cleaning fluid. In order to supply the stream of cleaning fluid to the boiler interior volume 58, the pivot joint 18 includes an opening 60 adjacent to the boiler interior volume 58.

FIG. 2 shows the exterior portion 26 of the pivot joint socket 22 forming a substantially fluid-tight wall box seal 62 with the sealing portion 20 of the pivot joint 18 when the water cannon assembly 14 is in a first position, the operating position 64. In order to assist in forming the wall box seal 62, a spring 63 is preferably positioned between a flange on the steering tube 32 and the cardon joint 36. The spring 63 applies a force on the steering tube 32 in a direction parallel with the water cannon axis 56 in a direction away from the wall box 10. Therefore, the spring 63 causes the pivot joint 18 to press up against the interior portion 24 of the pivot joint socket 22 and improve the wall box seal 62.

As discussed in the background section, it may be desirable to remove the water cannon assembly 14 from the boiler wall 52 for various reasons, such as maintenance. An assembly for removing the water cannon assembly 14 from the boiler wall 52 will now be discussed in more detail.

FIG. 2 shows an aspirating device 66 connected to the outer surface of the steering tube in order to facilitate the removal of the water cannon assembly 14 from the boiler wall 52. The steering tube 32 includes a plurality of aspirating openings 68 extending completely through the steering tube walls. The aspirating openings 68 are preferably angled with respect to the water cannon assembly axis 56 such that fluid flowing through the aspirating openings 68 flows towards the nozzle 42.

The aspirating device 66 is located along the steering tube such that the aspirating openings 68 are enclosed by the aspirating device 66. More specifically, the aspirating device 66 includes a chamber wall surface 70 that defines an aspirating chamber 72, and the aspirating chamber 72 is aligned with the aspirating openings 68. In order to form a fluid-tight seal around the aspirating chamber 72, the aspirating device 66 preferably includes a plurality of sealing channels 74 that receive sealing members 76.

Figure 3:
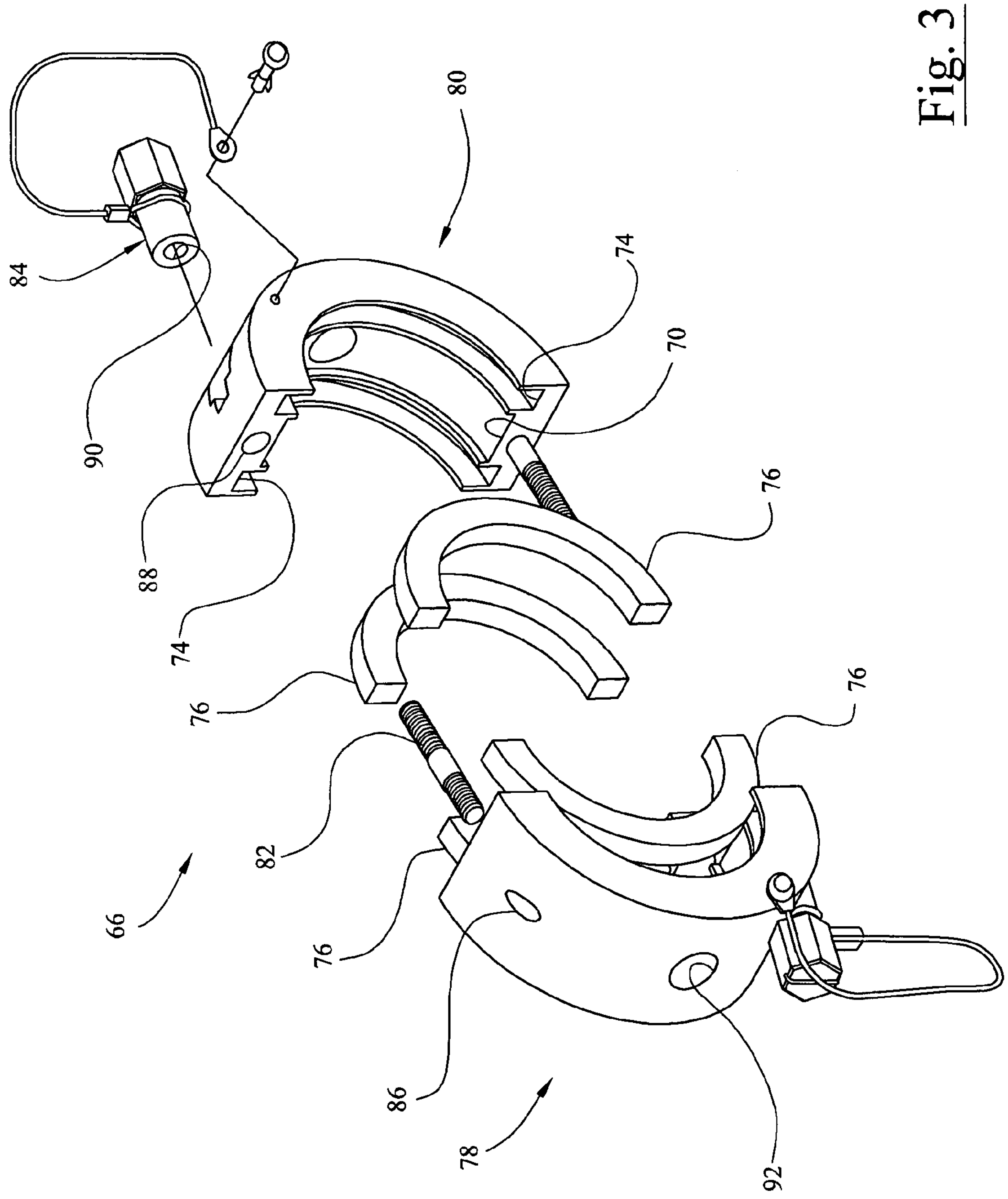
FIG. 3 is a close-up, exploded view of the aspirating device shown in FIG. 2.

FIG. 3 shows an exploded view of one embodiment of the aspirating device 66. The aspirating device 66 preferably includes two ring sections 78, 80 that clamp together in order to form the aspirating chamber 72. The aspirating chamber 72 preferably has a ring-shaped cross section in order to extend completely around the steering tube 32. The sealing channels 74 also preferably have a ring-shaped cross section in order to extend completely around the steering tube 32 and in order to receive the curved sealing members 76. The sealing members 76 are preferably comprised of an elastic material, such as rubber in order to effectively form a fluid-tight seal with the steering tube 32.

The ring sections 78, 80 are preferably clamped together by appropriate fasteners, such as the threaded fasteners 82 and the threaded receiving heads 84 shown in FIG. 3. More specifically, the first ring section 78 preferably includes a threaded opening 86 that forms a threaded-engagement with the threaded fastener 82, and the second ring section 80 includes an opening 88 having a diameter larger than the outer diameter of the threaded fastener 82. The threaded fastener 82 is configured to slide through the opening 88 in order to be received by a threaded opening 90 of the threaded receiving head 84, which is located on the outer surface of the second ring section 80. As shown in FIG. 3, the aspirating device 66 may include a plurality of threaded fasteners 82 and a plurality of threaded receiving heads 84.

The aspirating device 66 also includes an air supply opening 92 that is in fluid connection with the aspirating chamber 72. During operation of the aspirating device 66, an aspirating fluid (such as air) that is supplied to the air supply opening 92 will flow into the aspirating chamber 72, through the aspirating openings 68, and into a conduit defined by the steering tube 32.

Referring back to FIG. 2, when the water cannon assembly 14 is in operation, the stream of cleaning fluid substantially prevents boiler gasses from entering the water cannon assembly supply tube 40. The aspirating device 66 substantially prevents these boiler gasses from entering the water cannon assembly 14 by providing the aspirating fluid flow through the aspirating openings 68.

Therefore, once the aspirating device 66 is installed and an air flow is provided to the air supply opening 92, the stream of cleaning fluid through the supply tube 40 may be discontinued and the supply tube 40 may be removed from the water cannon assembly 14. The supply tube 40 is preferably disconnected from the steering tube 32 by removing a plurality of fasteners (not shown) that connects the collar portion 94 of the supply tube 40 to the cardon joint 36. Once the fasteners are removed from the collar potion 94, the supply tube 40 may be easily retracted from the steering tube 32.

Once the supply tube 40 is removed from the steering tube 32, the aspirating fluid flow from the aspirating device 66 will create a partial vacuum within the steering tube conduit 96. More specifically, the angle and positioning of the aspirating openings 68 creates a funnel-like effect within the steering tube 32 and forces the aspirating fluid into the boiler interior volume 58 and prevents boiler gasses from escaping. The air flow from the aspirating device 66 also serves to cool the steering tube 32 and the pivot joint 18.

In another example of alternative embodiments of the present invention, the assembly for removing the removable device includes an alternative aspirating device, or does not include an aspirating device. Particularly as used in connection with boilers having a minimal boiler interior volume pressure, or a negative internal volume pressure, an aspirating device may not be necessary in order to prevent the exchange of gasses between the boiler interior volume 58 and the ambient air. Furthermore, an alternative aspirating device may expel fluid into the removable device in a direction other than shown and described above. Additionally, an alternative aspirating device may prevent the exchange of gasses by a means other than injecting a fluid into the boiler interior volume 58.

Figure 4:
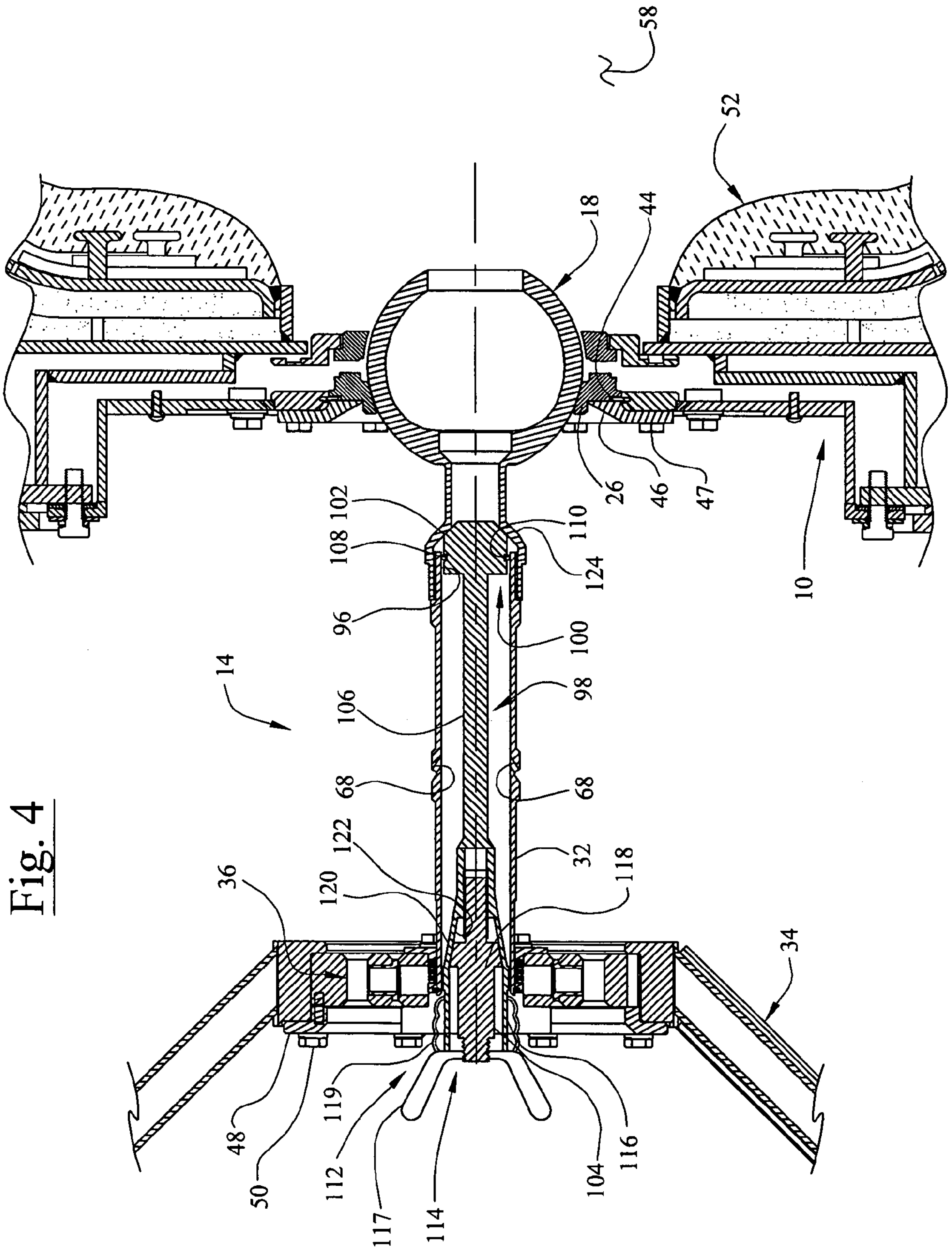
FIG. 4 is a cross-sectional view of the water cannon assembly shown in FIG. 2 having the supply tube removed and having a combustion device plug inserted within the steering tube.

Referring now to FIG. 4, another component of the assembly for removing the water cannon assembly 14 from the boiler wall 52 is shown. More specifically, a steering tube plug 98 is inserted into the steering tube conduit 96 in order to form a substantially fluid-tight steering tube plug seal 100. The steering tube plug seal 100 substantially prevents boiler gasses from entering the steering tube 32 through the pivot joint 18. Therefore, once the steering tube plug 98 is inserted into the steering tube 32, the aspirating device 66 may be removed from the water cannon assembly 14.

The steering tube plug 98 includes a head portion 102, a tail portion 104, and a shaft portion 106 connecting the two respective portions 102, 104. The head portion 102 of the steering tube plug 98 preferably includes a larger diameter than the shaft portion 106 in order to form the steering tube plug seal 100. The head portion 102 also preferably includes a seal ring 108 in order to more effectively form the steering tube plug seal 100 with the steering tube conduit 96. The seal ring 108 is preferably located within a channel 110 formed in the head portion 102 of the steering tube plug 98 in order to hold the seal ring 108 in place. The channel 110 is preferably an indentation formed in the outer surface of the head portion 102 and has a cross-sectional shape that mates with the seal ring 108.

The tail portion 104 of the steering tube plug 98 preferably includes a locking mechanism in order to secure the steering tube plug 98 in place. The locking mechanism 112 shown in FIG. 4 includes a wedge assembly including an outer wall 116 that radially expands in order to form a frictional engagement with the steering tube 32. More specifically, as a wing nut 117 is tightened, a conical wedge 118 is driven towards the head portion 102 of the steering tube plug 98, thus causing the conical portion 120 of the conical wedge 118 to move further into the conical section 122 of the outer wall 116. The radial force between the conical wedge 118 and the outer wall 116 substantially secures the steering tube plug 98. The locking mechanism 112 may further include a rubber bellow 119 in order to prevent contaminants from entering the locking mechanism 112 and to protect the user from getting pinched by the moving components of the locking mechanism 112. Any other appropriate alternative locking mechanisms may be used to secure the steering tube plug 98.

Although FIG. 4 shows the steering assembly 34 and the cardon joint 36 still attached to the water cannon assembly 14, it may be advantageous to remove one or both of these components 34, 36 from the water cannon assembly 14 before inserting the steering tube plug 98 into the steering tube 32. More specifically, the locking mechanism 112 may have a larger diameter than the cardon joint 36, thus making removal of the cardon joint 36 difficult. Additionally, the locking mechanism 112 may interfere with the removal of the fasteners 50 that secure the cardon joint clamping ring 48 to the steering assembly 34.

A portion a method of removing the pivot joint 18 from the boiler wall 52 will now be further discussed in more detail. Referring to FIG. 4, the fasteners 47 and the pivot joint clamping ring 46 are removed, exposing the retainer ring 44. The retainer ring 44 may not be able to sufficiently hold the exterior portion 26 of the pivot joint socket 22 after the steering assembly is removed. Therefore, it is advantageous to connect a clamp assembly (not shown) to the pivot joint 18 after removing the pivot joint clamping ring 46 and before removing the steering assembly 34.

The clamping assembly is preferably a metal plate having a notch in order to slide over the neck portion 124 of the pivot joint 18. The clamping assembly is preferably mounted to the pivot joint 18 by a plurality of adjustable clamps that maintain the clamping assembly in a position a specific distance from the wall box 10. More specifically, the adjustable clamps cause the clamping assembly to apply a force acting on the neck portion 124 of the pivot joint 18 in a direction perpendicular to and away from the wall box. The adjustable clamps are preferably threaded bolts extending through threaded portions of the clamping assembly and abutting the wall box 10 such that the slot portion of the clamping assembly exerts the force on the neck portion 124.

Once the clamping assembly is installed, the retaining ring 44 and the exterior portion 26 of the pivot joint socket 22 prevent the pivot joint 18 from moving away from the boiler interior volume 58, and the clamping assembly prevents the pivot joint 18 from moving towards the boiler interior volume 58.

After the clamping assembly is in place, the steering assembly 34 and the cardon joint 36 may be removed. The cardon joint 36 is disconnected from the spring 63, and therefore the wall box seal 62 would be more susceptible to leaking without the clamping assembly.

Figure 5:
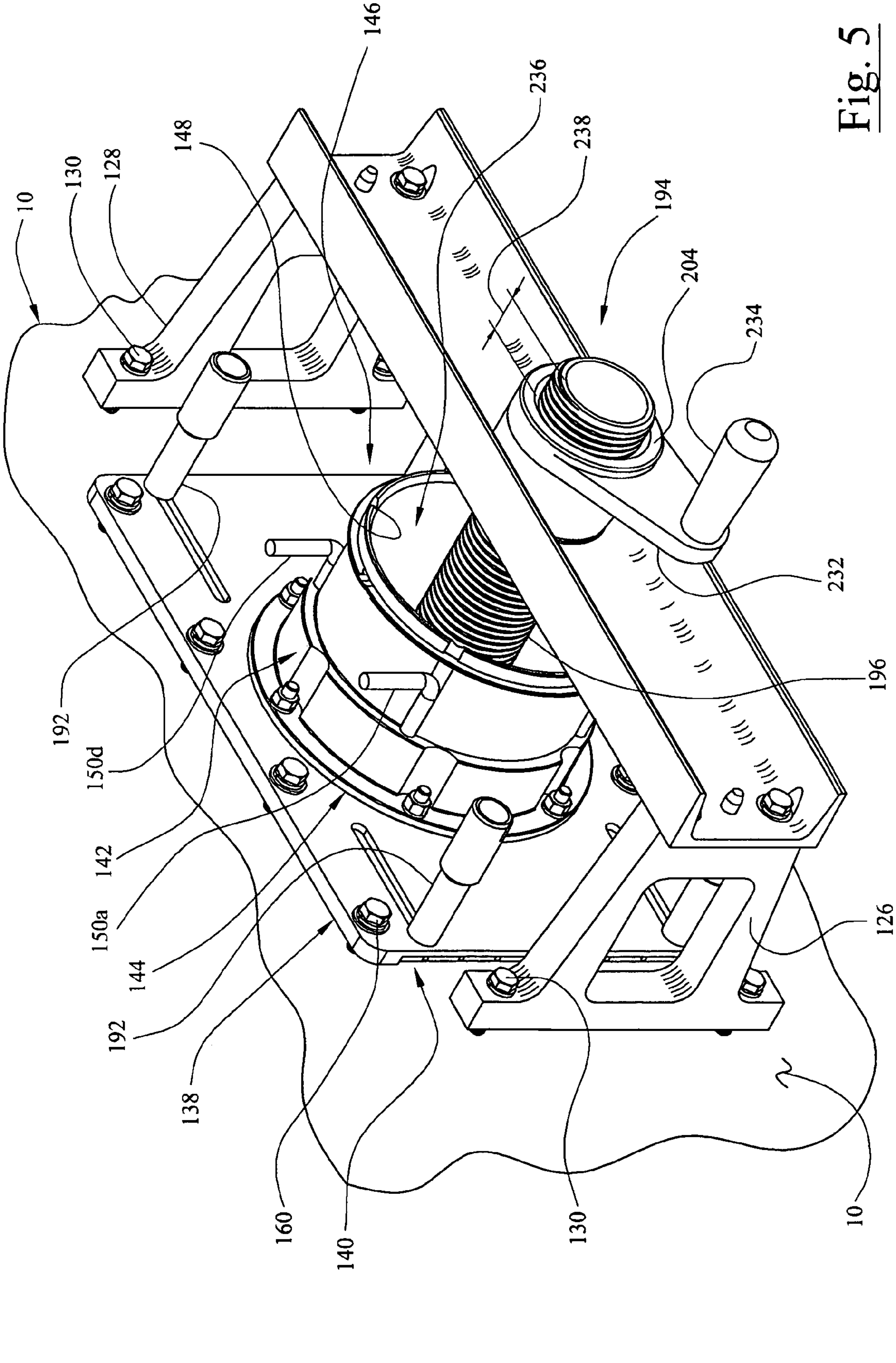
FIG. 5 is an isometric view of an assembly for removing the water cannon assembly shown in FIG. 1 from the wall box shown in FIG. 1, where the assembly includes a jack assembly in a first position and a sealing assembly having a sealing panel assembly and a sealing collar assembly.

Due to the weight of the steering assembly 34, it may be advantageous to use a hoist to stabilize the steering assembly 34 during its removal. Referring now to FIG. 5, once the steering assembly 34 has been removed, a pair of bridge extension feet 126, 128 is preferably connected to the wall box 10 by a plurality of fasteners 130. The bridge extension feet 126, 128 extend substantially perpendicularly from the wall box 10 in order to facilitate the removal of the pivot joint 18 from the wall box 10, as will be discussed in further detail below.

Next, the clamping assembly is preferably removed from the pivot joint neck portion 124. In order to maintain the substantially fluid-tight seal between the interior portion 24 of the pivot joint socket 22 and the sealing portion 20 of the pivot joint 18, the steering tube 32 is preferably manually pulled away from the boiler interior volume 58 with a force sufficient to maintain the wall box seal 62. The manual force required to maintain the wall box seal 62 is generally equal to the gravitational force pulling on the steering tube 32, and therefore it is a relatively low force.

Figure 7:
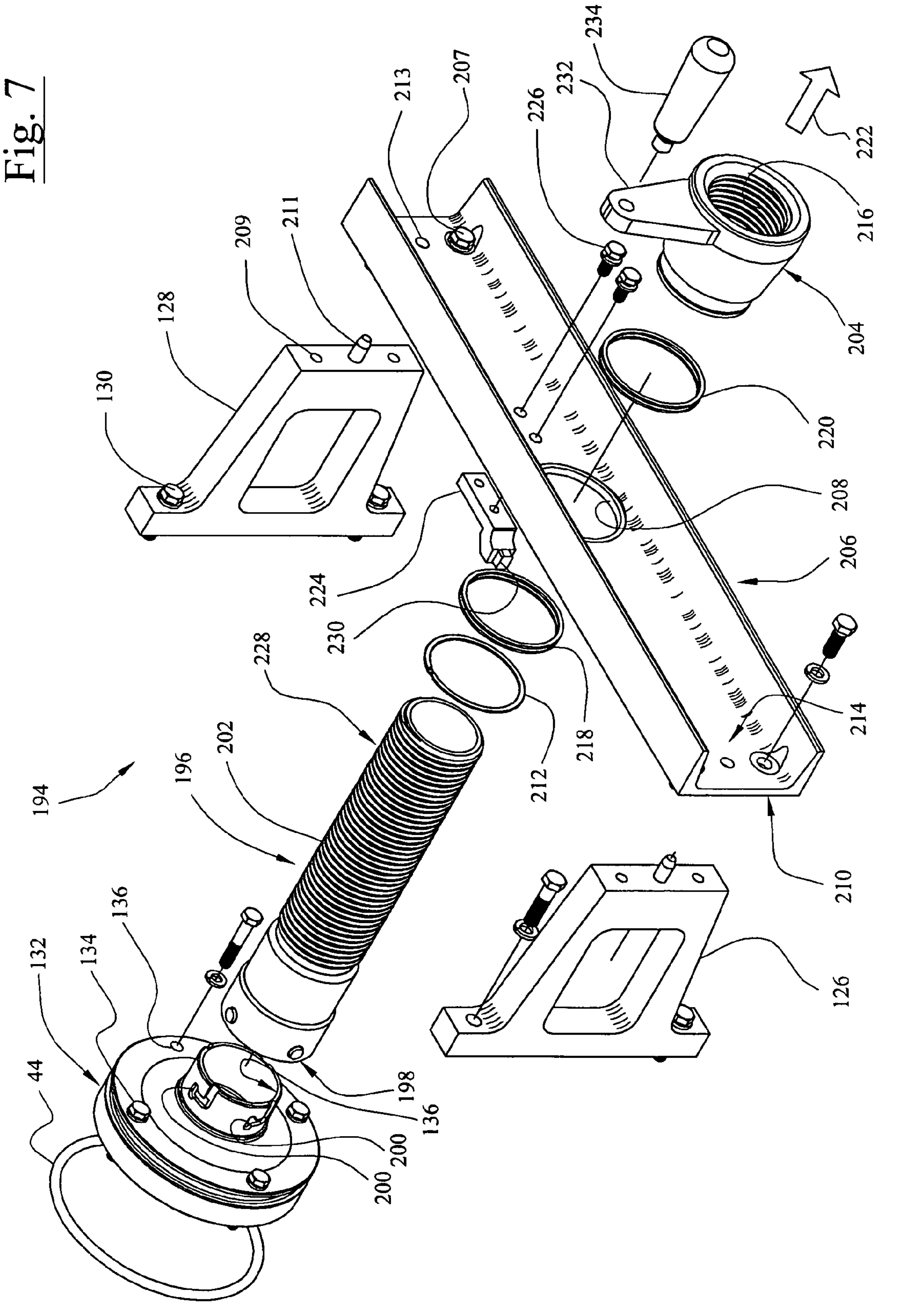
FIG. 7 is an isometric, exploded view of the jack assembly shown in FIG. 5.

Referring now to FIG. 7, a pivot joint adapter 132 is next preferably attached to the pivot joint socket 22 by fasteners 134 extending through openings 136 and threading into the exterior portion 26 of the pivot joint socket 22. The pivot joint adapter 132 includes a central opening 136 having an inner diameter slightly larger than the outer diameter than the steering tube so that the steering tube 32 extends through the central opening 136 of the pivot joint adapter 132. Once the pivot joint adapter 132 is connected to the pivot joint socket 22, the central opening 136 of the pivot joint adapter 132 substantially prevents radial movement of the steering tube 32, and thus provides enough support to counteract gravitational forces acting on the steering tube 32. Therefore, the manual force applied to the steering tube 32 is no longer necessary to maintain the wall box seal 62.

Referring back to FIG. 5, another component of the assembly for removing the water cannon assembly 14 from the wall box 10 is shown. More specifically, a sealing assembly 146 is coupled to the wall box 10 and forms a substantially fluid-tight seal with the pivot joint adaptor 132, as will be discussed in more detail below. The sealing assembly 146 includes a sealing panel assembly 138 that is attached to the wall box 10 and a sealing collar assembly 142 that is connected to the sealing panel assembly 138. The sealing panel assembly 138 is preferably located between the wall box 10 and the sealing collar assembly 142.

The sealing panel assembly 138 forms a substantially water-tight seal 140 with the wall box 10. Additionally, the sealing collar assembly 142 and the sealing panel assembly 138 preferably form a substantially fluid-tight seal 144. The sealing panel assembly 138 and the sealing collar assembly are shown in FIG. 5 as two, integral components. However, the sealing panel assembly 138 and the sealing collar assembly 142 may alternatively be formed by a single, unitary structure.

Figure 6:
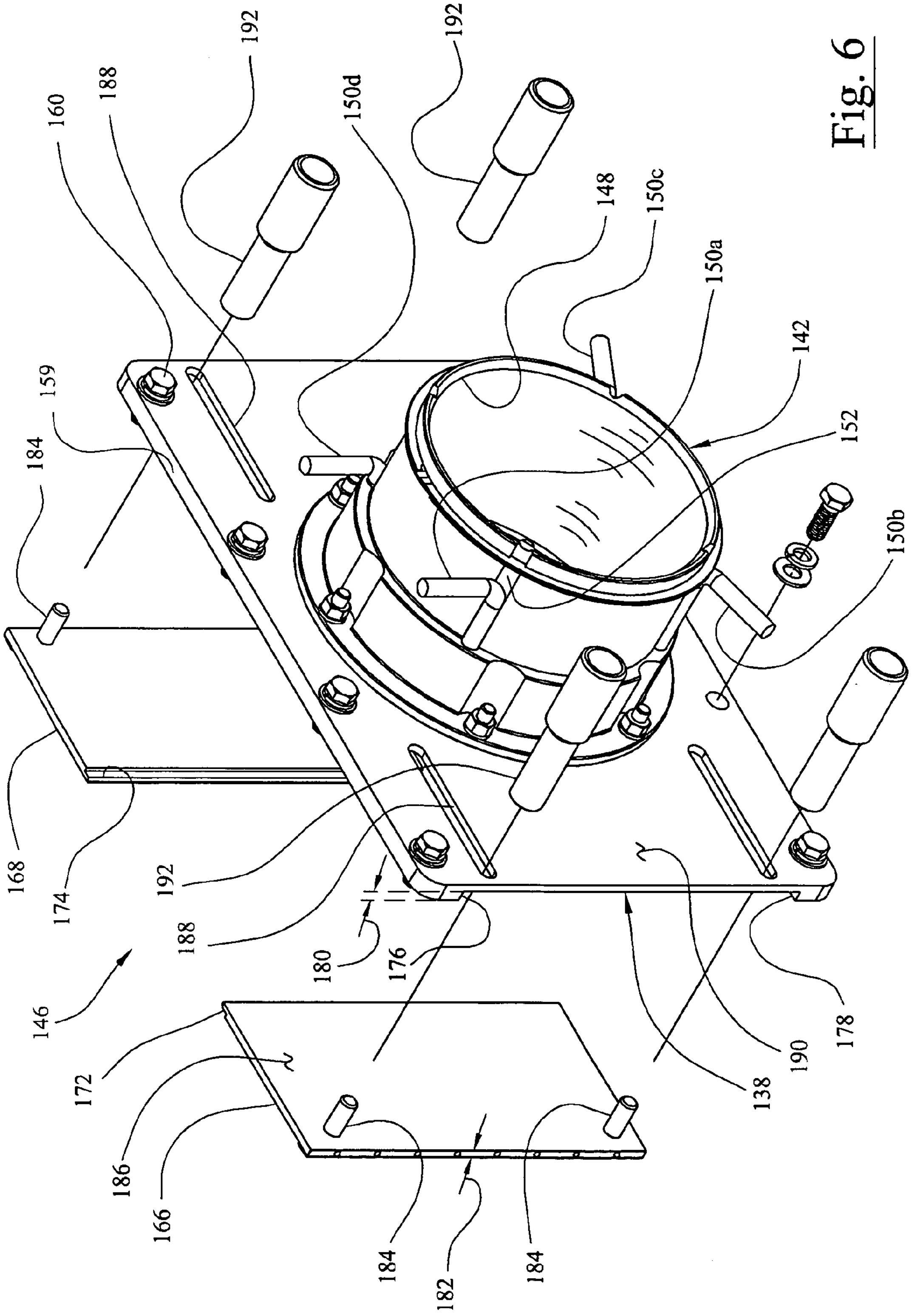
FIG. 6 is an isometric, view of the sealing assembly shown in FIG. 5, showing the sealing panel assembly with a pair of exploded sealing panels.

Referring now to FIG. 6, the details of the sealing panel assembly 138 and the sealing collar assembly 142 shown in this embodiment will now be discussed. The sealing collar assembly 142 includes an inner surface 148 configured to form a substantially fluid-tight seal with the pivot joint adapter 132 during removal of the pivot joint 18 from the wall box 10, as will be discussed in further detail below. Therefore, the inner surface 148 of the sealing collar assembly 142 is preferably the same shape and size as the pivot joint adapter 132.

The sealing collar assembly 142 also includes at least one release pin 150*a* that is configured to disengage the retainer ring 44 such that the pivot joint socket 22 and the pivot joint 18 can be freely removed from the wall box 10. The sealing collar assembly 142 shown in FIG. 6 includes a second, a third, and a fourth release pin 150*b*, 150*c*, 150*d*, where each respective release pin 150 (the reference number 150 is used to generally refer to the four release pins 150*a*, 150*b*, 150*c*, and 150*d*) cooperates to release the retainer ring 44 as desired.

More specifically, the release pins 150 each have locked position where the retainer ring 44 is able to lock the pivot joint socket 22 to the wall box 10 as shown in FIG. 2, and an unlocked position where the retainer ring 44 is disengaged. The release pins 150*a*, 150*b*, 150*c* shown in FIG. 6 are each respectively in the locked position. Conversely, the release pin 150*d* has been slidably moved towards the sealing panel assembly 138 in order to at least partially disengage the retainer ring 44. As shown in FIG. 1, the retainer ring 44 includes a slot 154 in order to allow the retainer ring diameter to contract, and thus allowing the retainer ring 44 to disengage.

In order to facilitate the sliding movement of the release pins 150, the sealing collar assembly 142 includes a plurality of channels 152 that slidably receive the respective release pins 150, and the sealing panel assembly 138 includes a plurality of openings (not shown) aligned with each of the respective channels 152 in order to permit the respective release pins 150 to extend there through and engage the retainer ring 44.

Referring now to FIG. 2, the wall box 10 includes a guide channel 156 for receiving a portion of the retainer ring 44 and preventing longitudinal of such (where longitudinal motion is defined as being generally perpendicular with the wall box 10 face). The pivot joint socket 22 likewise includes a guide channel 158 to prevent the pivot joint socket 22 from moving in the longitudinal direction. When one of the respective release pins 150, such as the release pin 150*d*, is moved to its open position, the diameter of the retainer ring 44 decreases and the retainer ring 44 is at least partially unseated from the guide channel 156. Once each of the respective release pins 150 has been moved to the open position, the retainer ring 44 is preferably completely unseated from the guide channel 156, releasing the retainer ring 44 and the pivot joint socket 22 from the wall box 10.

In order to promote a smooth and effective release of the retainer ring 44, some or all of the release pins 150 may include a tapered end (not shown) that engages the retainer ring 44. The tapered end may have a conical, a rounded, or any other appropriate shape for promoting radially inward movement of the retainer ring 44 (where the radial direction is generally parallel to the wall box 10 face).

The sealing panel assembly 138 shown in FIG. 6 will now be discussed in more detail. The sealing panel assembly 138 includes a sealing panel base portion 159 that is fastened to the wall box 10 via a plurality of fasteners 160 in order to form the seal 140. As shown in FIGS. 2 and 6, the fasteners 140 extend through openings (not shown) in the wall box 10 and into a chamber 162 defined by the wall box walls. The chamber 162 preferably receives sealing air that flows from the chamber 162 into the boiler interior volume 58 via a plurality of seal air openings 164 (shown in FIG. 2) adjacent to the pivot joint interior portion 24. During operation of the water cannon assembly 14 the sealing flow substantially prevents boiler gasses from entering the chamber 162 through the seal air openings 164 due to relatively high velocity of the sealing flow. Furthermore, during removal of the water cannon assembly 14 from the wall box 10, the sealing flow is able to flow through the wall box openings once the fasteners 140 are removed. Therefore, while the fasteners 140 are removed, it is desirous to maintain a relatively high velocity sealing flow in order to prevent boiler gasses from exiting the wall box.

Figure 8:
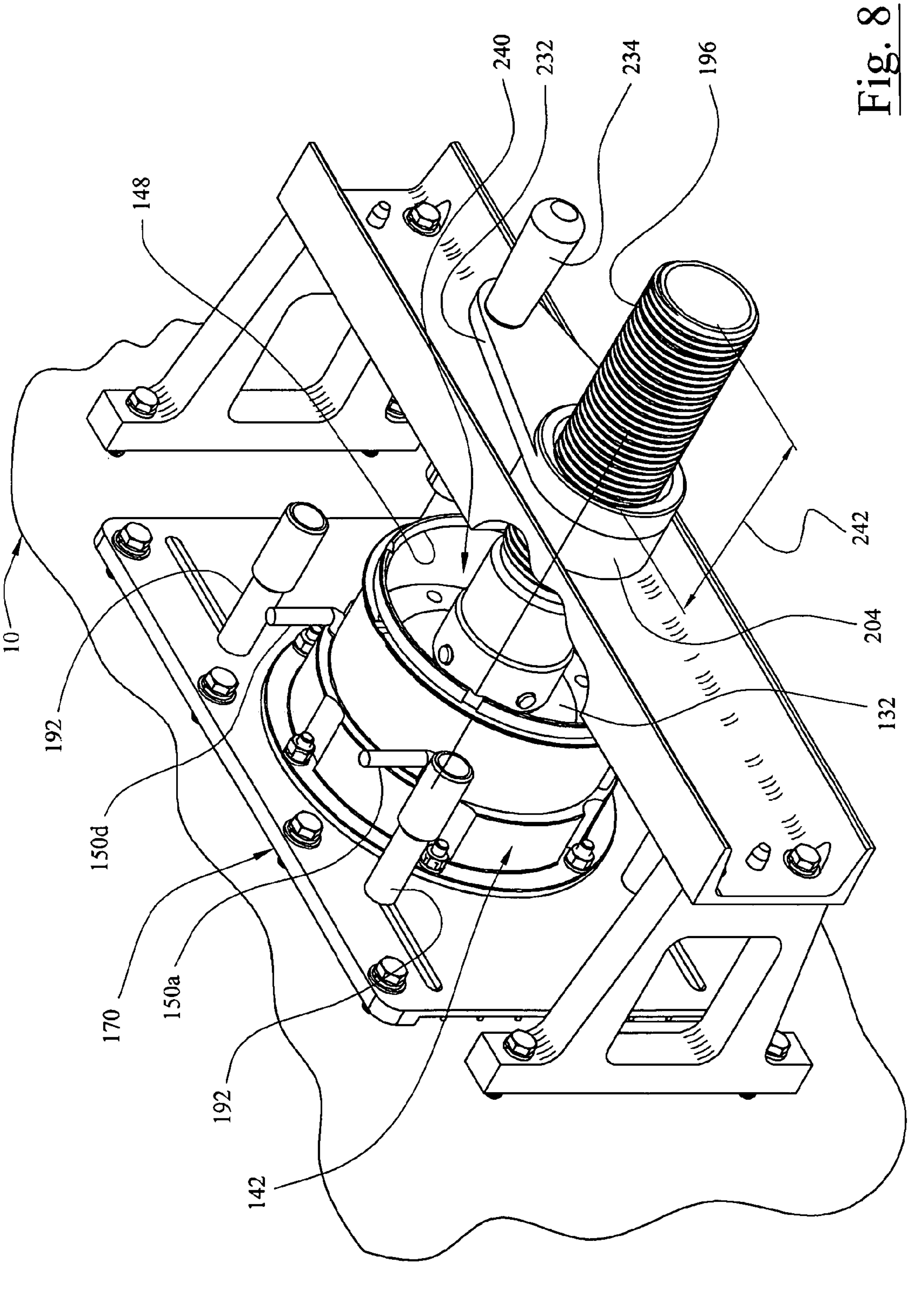
FIG. 8 is an isometric view of the assembly for removing the water cannon assembly shown in FIG. 5, where the jack assembly is in a second position.

Referring back to FIG. 6, the sealing panel assembly 138 preferably includes a pair of sealing panels 166, 168 configured to slidably move with respect to the sliding panel base portion 159 and selectively engage each other in order to form a substantially fluid-tight sealing panel seal 170 (shown in FIG. 8). In order to more effectively form the sealing panel seal 170, the respective sealing panels 166, 168 preferably include engaging surfaces such as mating edge portions 172, 174 extending from the respective sealing panels 166, 168 in a direction substantially parallel to each other. The mating edge portions 172, 174 may further include a snap-tight engagement or other sealing mechanism in order to improve the sealing panel seal 170. Although the sealing panel assembly 138 shown in the figures includes a pair of sealing panels 166, 168, any appropriate number of sealing panels may be used, such as a single sealing panel.

The sealing panel assembly 138 shown in FIG. 6 preferably includes upper and lower track portions 176, 178 that slideably receive the sealing panels 166, 168. The track portions 176, 178 are preferably parallel to each other and are located a distance from each other that is approximately equal to the height of the sealing panels 166, 168 in order to form a seal with the panels 166, 168. The track portions 176, 178 shown in FIG. 6 are flanges extending perpendicularly from the rear surface of the sealing panel assembly 138 and preferably have a relatively low-friction engagement with the sealing panels 166, 168.

The track portions 176, 178 shown in FIG. 6 have a width 80 substantially equal to the thickness 182 of the respective sealing panels 66, 68 in order to minimize unwanted movement of the sealing panels 166, 168 in a direction perpendicular to the faces of the sealing panels 166, 168. Alternatively, the sealing panel assembly 138 may include track portions that prevent the sealing panels 166, 168 from moving in a direction perpendicularly to their faces, such as by L-shaped flanges (not shown) extending around the edges of the panels 166, 168.

The sealing panel assembly 138 preferably includes an adjustment assembly for adjusting the respective positions of the sealing panels 166, 168 as desired. The adjustment assembly shown in FIG. 6 includes a cylindrical knob 184 extending from each of the sealing panels 166, 168 in a direction substantially perpendicular to the sealing panel faces 186. The cylindrical knobs 184 are aligned with and extend through receiving slots 188 formed in the base portion 159 of the sealing panel assembly 138 in order to allow the sealing panel assembly user to adjust the position of the sealing panels 166, 168 from the front side 190 of the base portion 159. Also shown in FIG. 6, the cylindrical knobs 184 are preferably coupled with locking handles 192 that perform two functions, providing a conveniently-sized handle to move the sealing panels 166, 168, and providing a locking mechanism to lock the sealing panels 166, 168 in place when desired.

The locking handles 192 preferably include a central bore configured to receive the cylindrical knobs 184, and more preferably include internal threads within the central bores in order to form a threaded engagement with external threads of the cylindrical knob. Thus, the sealing panels 166, 168 may be locked in a desired position by turning the locking handles 192 in a specified direction (such as in the clockwise direction as shown in FIG. 6), thereby causing a frictional engagement between the locking handle 192 and the base portion 159 and another frictional engagement between the sealing panels 166, 168 and the base portion 159. Alternatively, any appropriate locking mechanism may be used.

Similarly, the sealing panels 166, 168 may be released from the locking position by turning the locking handles 192 in the opposite direction (counter-clockwise), thereby releasing the locking handles 192 and the sealing panels 166, 168 from their respective frictional engagements with the base portion 159.

Referring now to FIG. 7, the components of a jack assembly 194 for aiding in the removal of the water cannon assembly 14 from the wall box 10 are shown. The jack assembly 194 mounts to the bridge extension feet 126, 128 and selectively engages the pivot joint adapter 132 in order to remove the pivot joint 18 from the wall box opening 16. Alternatively, the pivot joint 18 may be removed by hand instead of utilizing a jack assembly.

The jack assembly 194 shown in FIG. 7 includes a retracting device, such as a jack screw 196 that selectively engages the pivot joint adapter 132 by an appropriate connection, such as a tab-slot connector. The jack screw 196 shown in FIG. 7 includes a plurality of tabs (not shown) located adjacent to an en 198 of the jack screw, which are configured to slide into L-shaped receiving slots 200 located on the pivot joint adapter 132. During engagement between the jack screw 196 and the receiving slots 200, the tabs, which are preferably located within a hollowed-out cavity defined by the jack screw 198, are first inserted into a first portion of the receiving slots 100 that extends generally parallel to the jack screw 198. Next, the pivot joint adapter 132 and the jack screw 196 are rotated with respect to each other such that the tabs slide into a second portion of the receiving slots 200 that is perpendicular to the first portion. The second portion of the receiving slot 200 may further include an enlarged diameter portion in order to prevent the jack screw 196 from rotating with respect to the pivot joint adapter 132.

The jack assembly 194 shown in FIG. 7 includes components for causing translational movement of the jack screw 196 and the pivot joint adapter 132, thus removing the pivot joint 18 from the wall box opening 16. More specifically, the jack screw 196 preferably includes external threads 202 and a pivoting collar 204 that receives the jack screw 196 in a threaded engagement. Furthermore, a support bridge 206 extends between the respective bridge extension feet 126, 128 in a direction substantially perpendicular to the jack screw 196.

The support bridge 206 is preferably secured to the respective bridge extension feet 126, 128 by a plurality of fasteners 207 that are received by threaded openings 209. Also, the support bridge 206 and the bridge extension feet 126, 128 preferably include locating pins 211 and locating openings 213 for properly aligning the support bridge 206 with the respective bridge extension feet 126, 128 during assembly of the respective components.

As shown in FIG. 7, the jack screw 196 extends through an opening 208 in the support bridge having an inner diameter larger than the outer diameter of the jack screw 196 such that the jack screw 196 freely slides through the opening 208. On a first side of the support bridge 206, such as the bottom side 210 shown in FIG. 7, the external threads 202 of the jack screw 196 engage a retaining ring 212 via a threaded engagement. Additionally, on the other side of the support bridge 206, such as the top side 214 shown in FIG. 7, the external threads 202 of the jack screw 196 form a threaded engagement with internal threads 216 of the pivoting collar 204. As shown in FIG. 7, a thrust washer 218 may be located between the retaining ring 212 and the support bridge 206 on the bottom side 210 and a thrust washer 220 may be located between the support bridge 206 and the pivoting collar 204 on the top side 214.

As the pivoting collar 204 is rotated, radially-acting forces are applied to the jack screw 196 by the threaded engagement between the respective components 196, 204. As a result of the radially-acting forces, the jack screw 196 has a tendency to rotate in-place instead of moving axially (where axial movement is generally indicated by arrow 222 shown in FIG. 7). Therefore, the jack assembly 194 preferably includes an anti-rotational mechanism in order to substantially prevent rotational movement of the jack screw 196 and therefore convert rotational movement of the pivoting collar 204 into axial movement of the jack screw 196.

FIG. 7 shows an anti-rotation device 224 that is fastened to the support bridge 206 adjacent to the jack screw 196 by a pair of fasteners 226. The jack screw 196 shown in FIG. 7 also preferably includes an anti-rotational channel extending along the outer surface of the jack screw 196 in a direction substantially parallel to the axial direction 222. The anti-rotational channel, which is not visible in FIG. 7, but the location of which is generally indicated by reference number 228, receives a portion of the anti-rotational device 224 in order to allow axial movement between the anti-rotational device 224 and the jack screw 196, but to prevent rotational movement between the respective components 224, 196.

In order to form a mating engagement between the anti-rotational device 224 and the jack screw 196 while minimizing frictional forces between the two respective components, the anti-rotational device preferably includes an appendage 230 extending from the anti-rotational device 224 in a direction substantially perpendicular to the anti-rotational channel 228. The width of the anti-rotational channel 228 and the width of the appendage 230 are preferably substantially equal. More preferably, the width of the anti-rotational channel is slightly greater than the width of the appendage 230.

During operation of the jack assembly 194, the pivoting collar 204 is rotated in a first direction, such as clockwise, in order to cause relative rotational movement between the pivoting collar 204 and the jack screw 196. Due to the relative rotational movement between the pivoting collar 204 and the jack screw 196, axial movement results between the two components 204, 196. The direction of the axial movement will depend on the thread orientation of the respective components 204, 196. However, in one configuration a clockwise rotation of the pivoting collar 204 causes the jack screw 196 to move away from the wall box 10.

In order to facilitate rotation of the pivoting collar 204, the pivoting collar 204 preferably includes a flange 232 extending from the outer surface of the pivoting collar 204 in a direction substantially perpendicular to the axial direction 222. In order to further facilitate rotational movement of the pivoting collar 204, a handle 234 preferably extends from the flange 232. The handle 234 may have any appropriate shape, but it preferably has a shape that is easy to grip for a typical jack assembly operator.

Referring now to FIG. 5, the jack assembly 194 is connected to the pivot joint adapter 132 (as shown in FIG. 7), and the pivot joint adapter 132 is connected to the pivot joint 18. In the configuration shown in FIG. 5, the pivot joint 18 is in the first position (the operational position 64) in order to form the substantially fluid-tight wall box seal 62. Also shown in FIG. 5, the jack screw 196 is preferably in a fully-extended position such that the jack screw 196 extends beyond the pivoting collar 204 by a first distance 238.

The release pins 150*a*, 150*d* shown in FIG. 5 are preferably in a closed position when the pivot joint 18 is in the operational position 64 such that the retainer ring 44 is substantially located within the guide channel 156 (shown in FIG. 2). Furthermore, the locking handles 192 are preferably fully-extended away from the sealing collar assembly 142 such that the sealing panels 166, 168 are in an open position.

Referring now to FIG. 8, the pivot joint adapter 132 and the pivot joint 18 have been retracted from the wall box opening 16 such that the pivot joint 18 is in a second position, a maintenance position 240. Also, as shown in FIG. 8, the jack screw 196 has moved away from the wall box 10 such that the jack screw 196 extends a second distance 242 beyond the pivoting collar 204. As shown in FIGS. 5 and 8, the second distance 242 is greater than the first distance 238.

As shown in FIG. 8, the release pins 150*a*, 150*d* are preferably in an open position such that the retainer ring 44 has been disengaged from the wall box opening 16, thereby releasing the pivot joint 18 from the wall box 10. Furthermore, FIG. 8 shows the locking handles 192 in a position adjacent to the sealing collar assembly 142 such that the respective sealing panels 166, 168 are in the closed position in order to form the sealing panel seal, generally indicated by reference 170. The sealing panel seal 170 substantially prevents boiler gasses from escaping through the wall box opening 16 while the pivot joint 18 is in the maintenance position 240.

The wall box 10, the water cannon assembly 14, the sealing assembly 146, and the jack assembly 194 are preferably comprised of a high-temperature-resistant steel such RA-330 or an alloy such as Inconel 601, but other appropriate materials may be used.

The assembly for removing the water cannon assembly 14 from the wall box 10 described above and shown in the figures includes various embodiments of the present invention. However, the present invention may include various additional components, various alternative components, or fewer components than those described and shown above.

Another portion of a method of removing the pivot joint 18 from the boiler wall 52 will now be further discussed in more detail. Once the pivot joint adaptor 132 is connected to the pivot joint 18, the sealing panel assembly 146 is connected to the wall box 10 such that the sealing panels 166, 168 engage the wall box 10 in order to form the seal 140. The sealing collar assembly 142 is positioned such that the inner surface 148 of the sealing collar assembly 142 is aligned with the pivot joint 132. The sealing collar assembly 142 is then fastened to the sealing panel assembly 138 via fasteners.

After the sealing assembly 146 is connected to the wall box 10, the jack assembly 194 is connected to the bridge extension feet 126, 128 and the jack screw 196 is coupled to the pivot joint adaptor 132 as described above. Next, the release pins 150 are moved to an open position to collapse the retaining ring 44 and release the pivot joint 18 and the pivot joint socket 22 from the wall box opening 16.

Next, the pivot joint 18 is removed from the wall box opening 16 by rotating the jack assembly handle 234 in a clockwise direction until the pivot joint 18 is positioned such that the sliding panels 166, 168 are located between the pivot joint 18 and the wall box opening 16, as shown in FIG. 8. This position is the maintenance position 240.

Once the pivot joint 18 is in the maintenance position 240, the locking handles 192 are rotated counter-clockwise, thereby loosening the frictional engagement between the locking handles 192 and the sealing panel base portion 159. Then, the sliding panels 166, 168 are closed by sliding the locking handles 192 towards the sealing collar assembly 142 until the panels 166, 168 engage each other and form the sealing panel seal 170. The locking handles 192 are then tightened, and the sealing panel seal 170 is sufficient to seal the wall box opening 16 from the ambient air.

Once the sealing panel seal 170 is engaged, the handle 234 is further rotated clockwise until the pivot joint adaptor 132 is completely removed from the sealing collar assembly 142. At this point, the sealing panel seal 170 is directly separating the boiler gases from the ambient air. The support bridge 206, which is preferably still engaged with the jack screw 196, is next removed from the bridge extension feet 126, 128 in order to expose the pivot joint 18 and the retainer ring 44. The pivot joint 18 is then removed from the pivot joint adaptor 132.

It may be advantageous to install a boiler plug (not shown) into the wall box opening 16 in order to provide a more effective seal than the sealing panel seal 170. The boiler plug is preferably comprised of a high-temperature-resistant steel such RA-330 or an alloy such as Inconel 601, but other appropriate materials may be used. The boiler plug is preferably disc-shaped having a circular outer surface for mating with the wall box opening 16. The boiler plug preferably has a smooth outer surface with a diameter substantially equal to that of the pivot joint socket 22.

Next, the retainer ring 44 is positioned near the bottom of the pivot joint adaptor 132 as shown in FIG. 7. The boiler plug is then positioned such that the retainer ring 44 is between the pivot joint adaptor 132 and the boiler plug. Next, the boiler plug is connected to the pivot joint adaptor 132 by the fasteners 134 in a manner similar to the connection between the pivot joint adaptor 132 and the pivot joint socket 22.

The support bridge 206, which is still engaged with the jack screw and pivot joint adaptor 132, is then re-connected to the bridge extension feet 126, 128 such that the pivot joint adaptor 132 is aligned with the sealing collar assembly 142. Next, the handle 234 is rotated counter-clockwise until the pivot joint adaptor 132 is located within the sealing collar assembly 142 in order to form a substantially fluid-tight seal between the pivot joint adaptor 132 and the inner surface 148 of the sealing collar assembly 142.

Once the pivot joint adaptor 132 and the boiler plug have been inserted into the sealing collar assembly 142, the sealing panels 166, 168 may be re-opened by sliding the locking handles 192 away from the sealing collar assembly 142. The jack assembly handle 234 is then preferably rotated counter-clockwise until the boiler plug is located within a hard stop of the wall box opening 16. The release pins 150 are then moved to the closed position so the retainer ring 44 can snap into engagement in the guide channel 156 of the wall box 10.

Next, the fasteners 207 are removed so the support bridge 206 is released from the bridge extension feet 126, 128. The jack screw 196 and support bride 206 are then rotated counter-clockwise to release engagement from the pivot joint adaptor 132. The jack assembly 194 is then completely removed from the wall box 10, and the pivot joint adaptor 132 is removed from the sealing collar assembly 142 by hand. Then, the sealing assembly 146 is removed from the wall box 10, exposing the boiler plug and the retainer ring 44. Finally, the pivot joint clamping ring 46 is fastened to the wall box 10 in order to further secure the retainer ring 44 and the boiler plug in place.

In order to re-install the water cannon assembly 14, a process similar to that described above, but performed in reverse, is preferably utilized.

Figure 9:
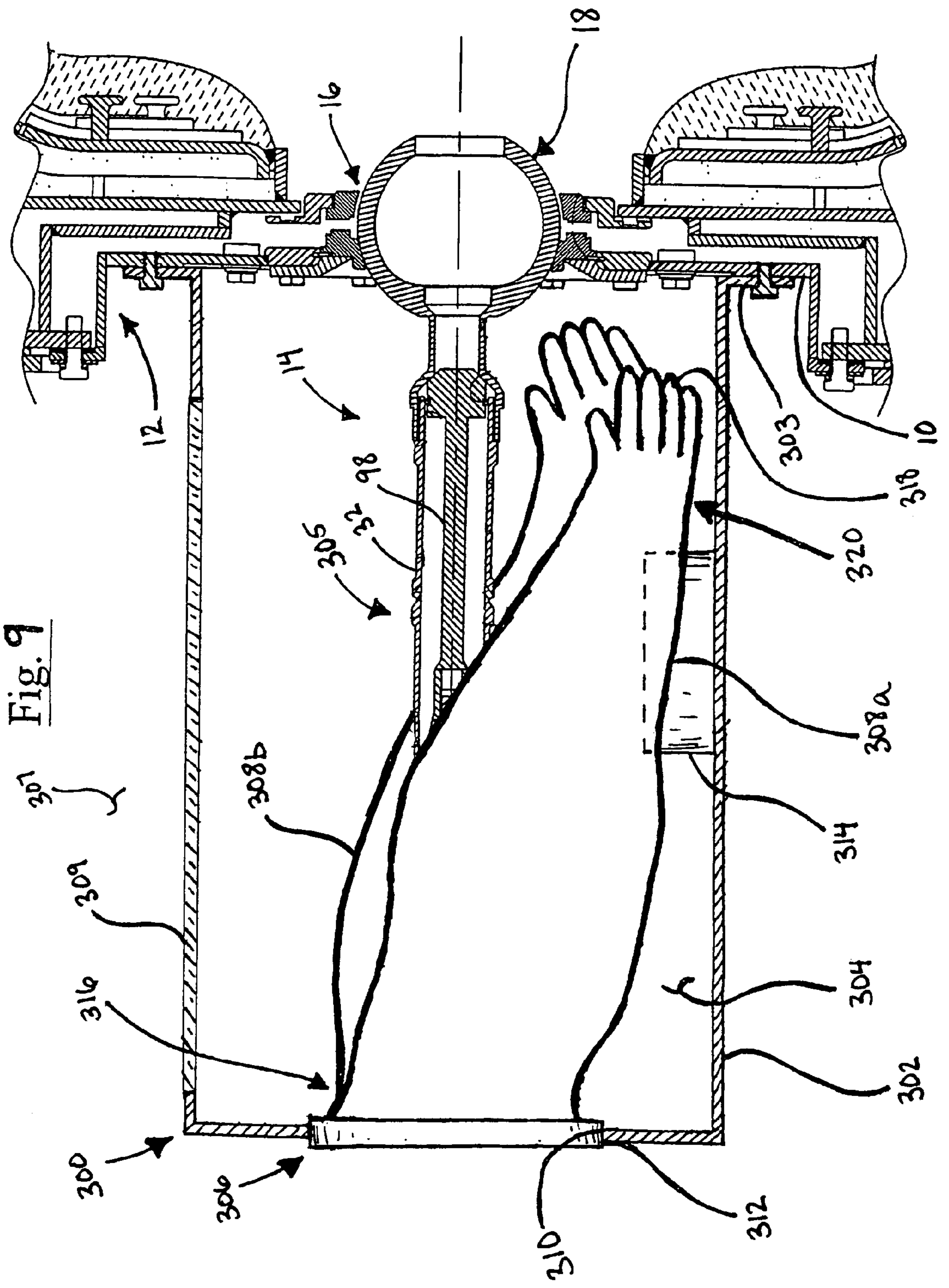
FIG. 9 is an alternative embodiment of an assembly for removing the water cannon from the wall box embodying the principles of the present invention.

Referring now to FIG. 9, an alternative assembly 300 for removing the water cannon assembly 14 from the wall box 10 is shown. The assembly 300 primarily includes a sealing box 302 cooperating with the wall box 10 to define a sealing chamber 304 and an access assembly 306 that provides access to the sealing chamber 304. The sealing chamber 304 encompasses a portion 305 of the water cannon assembly 14 and forms a substantially fluid tight seal with the wall box 10 to seal-off the portion 305 of the water cannon assembly from ambient air 307 and to permit removal and/or maintenance of the water cannon assembly 14 while the boiler is in use.

The sealing box 302 includes a flange 303 that is bolted to the wall box 10 to form the seal between the respective components 303, 12. Furthermore, the sealing box 302 is large enough to encompass the portion 305 of the water cannon assembly 14, which includes the pivot joint 18, the steering tube 32, and the steering tube plug 98 in the design shown in FIG. 9. As described above in more detail, the pivot joint 18, the steering tube 32, and the steering tube plug 98 cooperate to form a seal with the wall box opening 16 to prevent hot combustion gases from escaping from the boiler. Therefore, the sealing box 302 is connected to the wall box 10 while the respective components 18, 32, 98 are still cooperating to form the seal. Additionally, the top portion of the sealing box 302 includes a viewing portion, such as a transparent panel 309, to permit a user to view inside the sealing box 302. In an alternative design, the sealing box 302 includes an optical device, such as a video camera or an infrared imaging device, to permit the user to view inside the sealing box 302.

The access assembly 306 provides access to the water cannon assembly 14 without disrupting the fluid tight seal within the sealing chamber 304. For example, the access assembly 306 permits the user to perform maintenance on the portion 305 of the water cannon assembly 14 and/or remove the portion 305 of the water cannon assembly 14 without permitting the hot combustion gases to escape from the boiler. The access assembly 306 shown in the drawings includes a pair of protective sleeves 308*a*, 308*b* extending into the sealing chamber 304 via an access opening 310 in the sealing box 302 to facilitate such operations. For example, the protective sleeves 308*a*, 308*b* are configured to form a sleeve seal 312 with the sealing box 302 at a proximal end 316 thereof and include glove portions 318 at a distal end 320 thereof for handling components within the sealing box 302. The protective sleeves 308*a*, 308*b* are preferably made of a thermally insulated material to protect the user's arms and hands from the hot boiler gases. Furthermore, the protective sleeves 308*a*, 308*b* preferably include stiffening components embedded therein to prevent the protective sleeves 308*a*, 308*b* from collapsing inward onto the user's arms and hands due to a potentially increased pressure within the sealing chamber 304.

The assembly 300 further includes a plug 314 configured to be received within the wall box opening 16 after the portion 305 of the water cannon assembly 14 has been removed from the wall box opening 16. For example, the plug 314 has a diameter generally equal to that of the wall box opening 16 so as to form a generally fluid-tight seal therewith after the portion 305 of the water cannon assembly 14 has been removed. The plug 314 is preferably placed within the sealing box 302 before it is mounted to the wall box 10 so that the user has access to the plug 314 during the above described maintenance and/or component change. More specifically, the user first disconnects and removes the portion 305 of the water cannon assembly 14 from the wall box 10 and places the portion 305 of the water cannon assembly 14 on the floor of the sealing box 302. At this time, gasses from the boiler are able to enter the sealing chamber 304, thereby potentially heating the protective sleeves 308*a*, 308*b*. However, the boiler gases are preferably generally prevented from escaping from the sealing chamber 304 and are preferably generally prevented from excessively heating the user's arms and hands, as described above in more detail. Next, the user inserts and secures the plug 314 into the wall box opening 16 and forms the seal; thereby permitting the removal of the assembly 300 from the wall box 10.

The assembly 300 may be used in conjunction with, or as a replacement for, the assembly for removing water cannon assembly 16 that is disposed with respect to FIGS. 1-8. For example, the assembly 300 may be used in conjunction with, or as a replacement for, the following: the aspirating device 66, the steering tube plug 98, the sealing assembly 146, and the jack assembly 194.

In an alternative design, the assembly 300 includes one or more mechanically-controlled or electronically-controlled robotic arms for facilitating the above-described operations. The robotic arms are preferably made of materials capable of performing these operations under the relatively high-temperature, high-pressure conditions described herein. This robotic arms may be used in conjunction with, or as a replacement for, the protective sleeves 308*a*, 308*b*.

It is therefore intended that the foregoing detailed description be regarded as illustrative rather than limiting, and that it be understood that it is the following claims, including all equivalents, that are intending to define the spirit and scope of this invention. More particularly, the assembly and method described are merely an exemplary assembly and method, and they are not intended to be limiting. Many of the steps and devices for performing the steps described above may be eliminated or replaced by alternative steps and devices.

The invention claimed is:

1. An assembly for removing a water cannon assembly from a wall box, the wall box having a wall box opening and being coupled with a combustion device having an interior volume defined by a wall, the water cannon assembly including:

a steering tube having a steering tube conduit and an aspirating opening extending through the wall;

a supply tube located within the steering tube and defining a supply tube conduit configured to supply a cleaning fluid to the combustion device interior volume; and a pivot joint connected to the steering tube, the pivot joint forming a substantially fluid-tight wall box seal with the wall box opening when the water cannon assembly is in a first position with respect to the wall box;

the assembly comprising:

an aspirating device coupled with the steering tube in order to form a substantially fluid-tight aspirating seal between the aspirating device and the steering tube, wherein the aspirating device is configured to supply an aspirating fluid flow through the aspirating opening of the steering tube and into the steering tube conduit; and a sealing assembly located adjacent to the wall box opening, the sealing assembly and a sealing portion of the removable device forming a substantially fluid-tight seal when the removable device is in a second position with respect to the wall box.

2. The assembly in claim 1, wherein the sealing assembly includes a sealing collar assembly coupled to the wall box and the sealing collar assembly is configured to selectively form the seal when the water cannon assembly is in the second position.

3. The assembly in claim 2, wherein the sealing portion of the water cannon assembly includes an adaptor having an outer surface configured to form the seal with the sealing collar assembly.

4. The assembly in claim 1, wherein the sealing assembly further includes a sealing panel assembly configured to selectively form a substantially fluid-tight sealing panel seal when the water cannon assembly is in the second position.

5. The assembly in of claim 4, wherein the sealing panel assembly includes a sealing panel base portion and the sealing panel base portion forms a substantially fluid-tight base portion seal with the wall box.

6. The assembly in of claim 5, wherein the sealing panel assembly includes a movable panel configured to form the sealing panel seal when the water cannon assembly is in the second position.

7. The assembly in claim 1, further comprising an extracting assembly for moving the water cannon assembly from the first position to the second position.

8. The assembly in claim 7, wherein the extracting assembly includes a threaded screw, a rotatable threaded collar configured to receive the threaded screw, and an anti-rotation device configured to substantially prevent rotation of the threaded screw.

9. The assembly in of claim 1, wherein the aspirating device includes an inner surface defining a cavity, wherein the cavity is in fluid connection with the aspirating opening of the steering tube.

10. The assembly in of claim 9, wherein the aspirating fluid flow has a velocity sufficient to substantially prevent gases from exiting the combustion device interior volume via the wall box opening.

11. The assembly in of claim 1, wherein the combustion device is a positive pressure boiler.

12. An assembly for removing a removable device from a wall box, the wall box having a wall box opening and being coupled with a combustion device having an interior volume defined by a wall, wherein the wall box opening and the removable device are configured to form a substantially fluid-tight wall box seal, the removable device including a sleeve having an aspirating opening and a telescoping portion received within the sleeve, the assembly comprising:

an aspirating device coupled with the sleeve order to form a substantially fluid-tight aspirating seal between the aspirating device and the sleeve, wherein the aspirating device is configured to supply an aspirating fluid flow through the aspirating opening of the sleeve.

13. The assembly in claim 12, wherein the interior volume of the combustible device includes interior fluids, and the aspirating fluid flow has an aspirating fluid velocity sufficient to substantially prevent the interior fluids from entering the sleeve.

14. The assembly in claim 12, wherein the aspirating device includes an inner surface defining a cavity, wherein the cavity is in fluid connection with the aspirating opening of the sleeve.

15. The assembly in claim 14, wherein the removable device includes a water cannon assembly, the sleeve includes a steering tube, and the telescoping portion includes a supply tube configured to supply a cleaning fluid to the interior volume of the combustion device.

16. An assembly for removing a water cannon assembly from a wall box, the wall box having a wall box opening and being coupled with a combustion device having an interior volume defined by a wall, the assembly comprising:

a sealing box at least partially defining a sealing chamber encompassing at least a portion of the water cannon assembly, wherein the sealing chamber is configured to be substantially fluidly sealed from ambient air; and an access assembly configured to provide access to the portion of the water cannon assembly while the sealing chamber is substantially fluidly sealed from the ambient air.

17. The assembly in claim 16, wherein the sealing box is removably coupled with the wall box.

18. The assembly in claim 16, wherein the access assembly includes an access opening extending through the sealing box and a protective sleeve forming a substantially fluid tight sleeve seal with the sealing box.

19. The assembly in claim 16, further comprising a plug configured to be received within the wall box opening after the portion of the water cannon assembly has been removed from the wall box opening.

* * * * *